United States Patent
Sun (10) Patent No.: US 7,706,953 B1
(45) Date of Patent: Apr. 27, 2010

(54) SPEED STABILIZER FOR AUTOMATICALLY TURNING CONVENTIONAL CRUISE CONTROLS ON/OFF IN DENSE LOW SPEED TRAFFIC TO SAVE FUEL

(76) Inventor: Jun-shi Sun, 8 Iron Hollow Rd., Sharon, MA (US) 02067

( * ) Notice: Subject to any disclaimer, the term of this patent is extended or adjusted under 35 U.S.C. 154(b) by 799 days.

(21) Appl. No.: 11/589,432

(22) Filed: Oct. 30, 2006

(51) Int. Cl.
*B60T 8/32* (2006.01)

(52) U.S. Cl. .......................... 701/93; 123/399; 340/441
(58) Field of Classification Search .................. None
See application file for complete search history.

(56) References Cited

U.S. PATENT DOCUMENTS

| | | | |
|---|---|---|---|
| 4,541,052 A | 9/1985 | McCulloch | |
| 4,615,409 A | 10/1986 | Kupper | |
| 4,831,533 A | 5/1989 | Skoldheden | |
| 6,078,860 A | 6/2000 | Kerns | |
| 6,332,450 B1 * | 12/2001 | Muto et al. | 123/352 |

FOREIGN PATENT DOCUMENTS

| | | | |
|---|---|---|---|
| JP | 56-167825 | * | 12/1981 |
| JP | 60-138246 | * | 7/1985 |

* cited by examiner

*Primary Examiner*—Michael J. Zanelli
(74) *Attorney, Agent, or Firm*—Robert Nathans (57) ABSTRACT

The stabilizer works with any conventional cruise control (CC) and permits automatic CC in slower heavy traffic as it eliminates laborious frequent manual actuation of CC control buttons otherwise needed in such heavy traffic. More frequent automatic CC operation at slower speeds increases fuel efficiency. When the vehicle maintains a speed above a minimum speed and exceeds a brief preset period, the speed stabilizer sets the cruise control at that speed. When the cruise control is thus engaged, the driver's foot can move the accelerator pedal within a small tolerance range without canceling the cruise control. When the pedal is close to the bounds of the tolerance range, a warning signal such as a flashing LED display, is generated by the speed stabilizer to inform the driver that further movement of the pedal will cause acceleration/deceleration, automatically canceling cruise control. Actuation of conventional CC control buttons restores conventional CC.

20 Claims, 11 Drawing Sheets

Fig. 1

2a. Cruise control is not engaged

2b. Cruise control is engaged

Cruise Set

2c. Pedal position is close to the downward tolerance bound

Cruise Set   — 2e

2d. Pedal position is close to the upward tolerance bound

2f —  Cruise Set

SPEED STABILIZER FOR AUTOMATICALLY TURNING CONVENTIONAL CRUISE CONTROLS ON/OFF IN DENSE LOW SPEED TRAFFIC TO SAVE FUEL

The invention relates to the field of cruise control of motor vehicles.

BACKGROUND OF THE INVENTION

The present invention relates to the field of cruise control for motor vehicles and more particularly for controlling the speed of a motor vehicle via cruise control based on the position of the accelerator pedal.

Cruise control (CC) is a system used to maintain the constant speed of an automobile with the foot off the accelerator pedal. The benefits of cruise control include:

Better fuel efficiency;

Avoiding unconsciously violating speed limits;

Comfortable driving for long distances on the highway with less traffic.

While cruise control is installed on most vehicles today, it is only good for driving conditions with very low traffic volume. When traffic increases on the road, cruise control becomes less useful. As a result, many people claim that they never or rarely use it because it is "too much trouble". A second problem with cruise control is stepping on the brake or clutch to disengage the cruise control. This can cause the car to skid on a slippery road. Another problem is the lack of a need to maintain constant pedal pressure, which can help lead to accidents caused by highway hypnosis or incapacitated drivers.

A new type of cruise control is called adaptive cruise control (ACC) that uses a radar or laser to detect the vehicles in front, and automatically adjusts the speed for traffic, and brakes when necessary. ACC can be used regardless of the traffic. However, it is only available for some luxury models at this time. One problem with ACC is that it suffers from the "Tunnel Vision" effect (cannot see around corners, does not recognize fixed objects like trees, and fails to notice traffic merging or changing lanes). It also suffers from weather that affects the "vision" of the radar. Due to these problems, for local driving and driving on the highway with heavy traffic, taking the foot off the pedal and letting the ACC handle the vehicle is not a good idea. Besides, adaptive cruise control also produces the problem caused by highway hypnosis.

Another approach for solving the problems with the conventional cruise control is using a specially designed accelerator pedal along with controlling software to obtain constant speed. These are actually special kinds of cruise control. U.S. Pat. No. 4,541,052, U.S. Pat. No. 4,615,409 and U.S. Pat. No. 6,078,860 disclosed such kinds of speed control systems, which have the following disadvantages:

1. All these systems were developed for vehicles with electric throttle which is a drive-by-wire. While there is little doubt that drive-by-wire will become the standard in the future, most vehicles at this time still have a throttle with mechanical linkage.
2. They were designed as a total speed regulation system including accelerator pedal, throttle, engine control unit (ECU), cruise control, linkages, sensors, software and some other hardware. It is difficult to adapt these systems without fundamental changes for particular vehicle models.
3. With an electric throttle, the accelerator pedal position and the engine power output can have any kind of mapping. However, a mapping similar to the one for a mechanical throttle gives the driver a more natural driving experience. U.S. Pat. Nos. 6,078,860 and 4,615,409 divide the pedal travel path into deceleration, constant speed and acceleration ranges. Constant speeds can be maintained at a "natural position", which is at 25% of the pedal path for U.S. Pat. No. 6,078,860, or at a "0" point, which is between 10% and 40% for U.S. Pat. No. 4,615,409. In both cases, the 0 acceleration point is implemented by hardware with springs. It is not natural to have a single position corresponding for all constant speeds, and it is not natural to pass through 10% to 40% of the travel path to start acceleration. The system in U.S. Pat. No. 4,541,052 assumes a linear relation between the pedal position and the engine output power. Again, this is not natural. These special pedal and engine output mapping schemes make it difficult for various motor vehicle models to adapt to these technologies. U.S. Pat. No. 7,000,722 reveals a special accelerator pedal which can be used to resume cruise control. This device is only good for vehicles with an adaptive cruise control.

SUMMARY OF PREFERRED EMBODIMENTS OF THE INVENTION

The invention employs a unique speed stabilizer, which is an embedded system, or an add-on device to motor vehicles equipped with conventional cruise controls. The speed stabilizer advantageously utilizes standard inputs from standard motor vehicle components, and sends signals to set or cancel conventional cruise control apparatus. As an add-on, it works with all types of vehicles that provide these standard inputs for the device. Beneficially, it does not change any existing vehicle design, including the accelerator and engine output mapping schema and the cruise control software algorithm. The minimum speed for using conventional cruise control is about 35 miles/hour. Importantly, this minimum speed can be lowered to 20 to 30 miles/hour with the speed stabilizer of the present invention. This will cover the speed range for most local and highway driving, and enable the cruise control to be used without drivers laboriously actuating the conventional cruise control buttons and braking to set, resume or cancel the cruise control apparatus. Since the cruise control can be used much more often in heavy traffic on the highway and in local driving, the invention greatly increases fuel efficiency.

When the vehicle maintains a speed above the minimum speed setting of the cruise control, and exceeds a preset period, for example, one or two seconds, the speed stabilizer sets the cruise control at that speed. When the cruise control is thus engaged, the driver's foot can move the accelerator pedal within a small tolerance range without canceling the cruise control.

When the pedal is close to the bounds of the tolerance range, a warning signal such as a flashing LED display is generated by the speed stabilizer to inform the driver that further movement of the pedal will cause acceleration or deceleration that automatically cancels cruise control.

When the pedal is moved out of the tolerance range, the cruise control is automatically cancelled, and the driver gains back control. The speed stabilizer thus filters out the instability of human control of the accelerator pedal, and maximizes the period of constant speed driving and minimizes the driver's distracting work load of operating Set/Cancel buttons for engaging and disengaging the cruise control (CC). It retains all of the advantages of the regular cruise control apparatus, while advantageously enabling one to use cruise control regardless of the road, heavy traffic and weather conditions. It also makes using cruise control safer by eliminating the use of the brake or clutch, that tends to produce skidding, commonly used to cancel the conventional cruise control apparatus. Additionally, there is less chance of causing highway hypnosis compared to the aforesaid adaptive cruise control methods for driving in traffic, because the driver's foot is continually on the accelerator pedal. It also increases fuel efficiency at a time of rising gas prices, and it is a lower-cost and safer alternative to the relatively expensive adaptive cruise control devices. Thus, the speed control apparatus of the invention can be used for all vehicles employing conventional cruise control.

The speed stabilizer thus filters out the instability of human's control over the accelerator pedal. Importantly, it does not require hand operation to control the cruise control in medium to heavy traffic. While the usage of cruise control is maximized during periods of slower driving and yet the work load is minimized by the speed stabilizer, the driver will not feel any difference from normal driving. Optionally, the speed stabilizer's operation can be overridden by the hand operation on the control buttons. Thus, the driver can still press the conventional Set or Resume buttons, and then take the foot off the accelerator on highway with low traffic conditions.

BRIEF DESCRIPTION OF THE DRAWINGS

Other features and advantages of the invention will become more apparent upon study of the following description taken in conjunction with the drawings in which.

DETAILED DESCRIPTION OF PREFERRED EMBODIMENTS OF THE INVENTION

The speed stabilizer of the invention is an embedded system for maximizing the usage of cruise control based on the accelerator pedal position and the vehicle speed. It sets the cruise control when the speed remains stable for a preset small period, and cancels the cruise control when the vehicle accelerates or decelerates. The speed stabilizer enables us to use cruise control safely in medium to heavy traffic without hand operations being involved. As an embedded system, the software of the invention can be hosted in a separate microprocessor, or shares an existing process such as the Engine Control Unit (ECU).

Concepts and Terminologies

Figure 1:
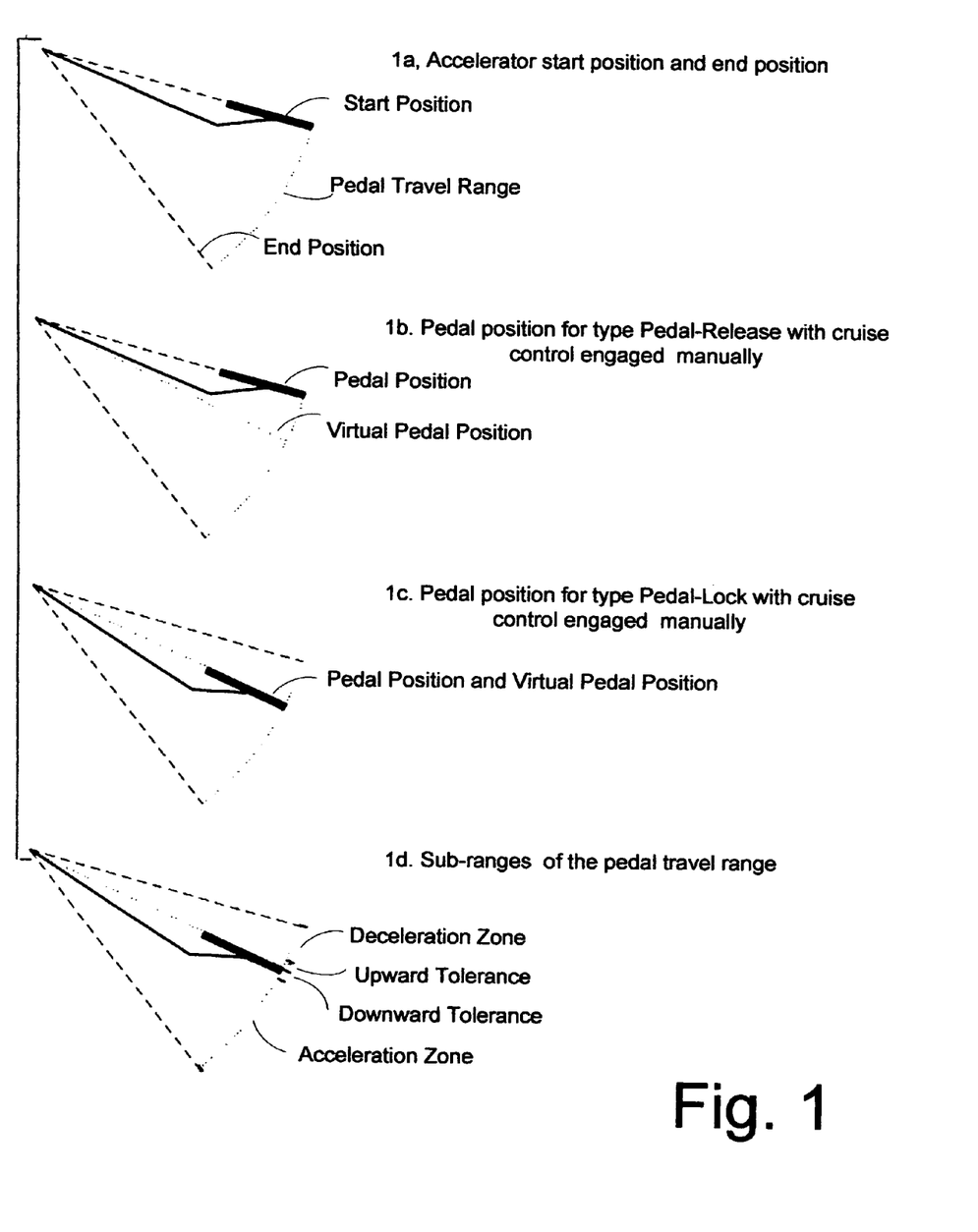
FIGS. 1a-1d disclose various accelerator pedal (pedal) positions useful in understanding the operation of the speed stabilizer of the invention.

A. Start Position, End Position and Travel Range of the Accelerator Pedal: Shown in FIG. 1a.

B. Virtual Pedal Position: The position corresponding to the throttle position if the cruise control was not engaged, regardless of the mapping schema of the accelerator position and engine power output. Virtual position is labeled in FIGS. 1b and 1c.

C. Accelerator Pedal Behaviors: The accelerator pedal of a vehicle behaves in one of two ways when the cruise control is engaged and the foot is off the pedal: the pedal comes back to the start position (FIG. 1b), or the pedal is held by the cruise control at the position corresponding to the throttle position or the virtual pedal position (FIG. 1c) as defined above. The pedal can still be moved downward, but not upward. The virtual pedal position changes when the throttle position changes as the vehicle goes up or down hill. For convenience, we refer to the former type as 'pedal-release', and the later as 'pedal-lock'. While it is possible to use the speed stabilizer with pedal-lock type with extra hardware, it is recommended to use pedal-release type because it is simpler.

D. Four Basic Types of Vehicles for the Speed Stabilizer: Combining the throttle types and the pedal behaviors, we can have four types of vehicles:
Electronic throttle/Pedal-release.
Electronic throttle/Pedal lock
Mechanical throttle/Pedal-release.
Mechanical throttle/Pedal-lock.

E. Sub-ranges of the acceleration travel range: When the cruise control is engaged, the pedal travel range is dynamically divided into four sub-ranges (1d): Deceleration Zone, Upward Tolerance, Downward Tolerance and Acceleration Zone. The sub-ranges changes as the throttle changes. Table 1 summarizes the actions evoked by the accelerator pedal in each sub-range for different types of vehicles.

TABLE 1

| | | Accelerator position and speed stabilizer action | | | |
|---|---|---|---|---|---|
| Action Upon Acceleration | Throttle Type | Deceleration Zone | Upward Tolerance | Downward Tolerance | Acceleration Zone |
| Conventional | Electronic Mechanical | Cancel CC | Constant speed; Deceleration warning signal | Accelerate with CC Engaged; Acceleration warning signal | Accelerate with CC Engaged Cancel CC |
| Preferred | Mechanical Electronic | | | | |

TABLE 1-continued

Accelerator position and speed stabilizer action

| Action Upon Acceleration | Throttle Type | Deceleration Zone | Upward Tolerance | Downward Tolerance | Acceleration Zone |
|---|---|---|---|---|---|
| | | | | Constant speed; Acceleration warning signal | |

Releasing the pedal upward into the deceleration zone cancels the cruise control for all types. Inside the upward tolerance, when the pedal approaches the upper bound of the tolerance, a deceleration signal is generated. The size of the upward tolerance can be zero. In this case, the pedal moves to the deceleration zone from the virtual pedal position directly and no deceleration signal is generated. The other two sub-ranges are more complicated. Moving into the acceleration zone can have two types of responses. The conventional cruise control accelerates without changing the cruise control speed setting. The preferred way for the speed stabilizer to operate is to cancel the cruise control. This behavior is consistent with the deceleration zone. The downward tolerance functions differently from the upward tolerance. For a mechanical throttle, the pedal actually pulls the throttle to open more via mechanical linkage, and the vehicle accelerates. This tolerance is used to generate the acceleration warning signal when the pedal is approaching the bound. The cruise control with an electronic throttle works the same way on acceleration. However, we can make it work the preferred way, maintaining constant speed as in the upward tolerance, by making the ECU ignoring the pedal position changes in the downward tolerance.

F. Cruise control functions: The cruise control has "Set", "Resume", "Cancel", "Accel" and "Coast" switches. "Set" engages the cruise control. "Resume" engages the cruise control at the speed set before. "Cancel" disengages the cruise control. "Accel" increases the engaged speed stepwise or continually. "Coast" reduces the engaged speed step-wise or continually. The "Cancel" switch is controlled by foot via the break and clutch. Some cruise controls also provide a button to cancel the cruise control.

Figure 10A:
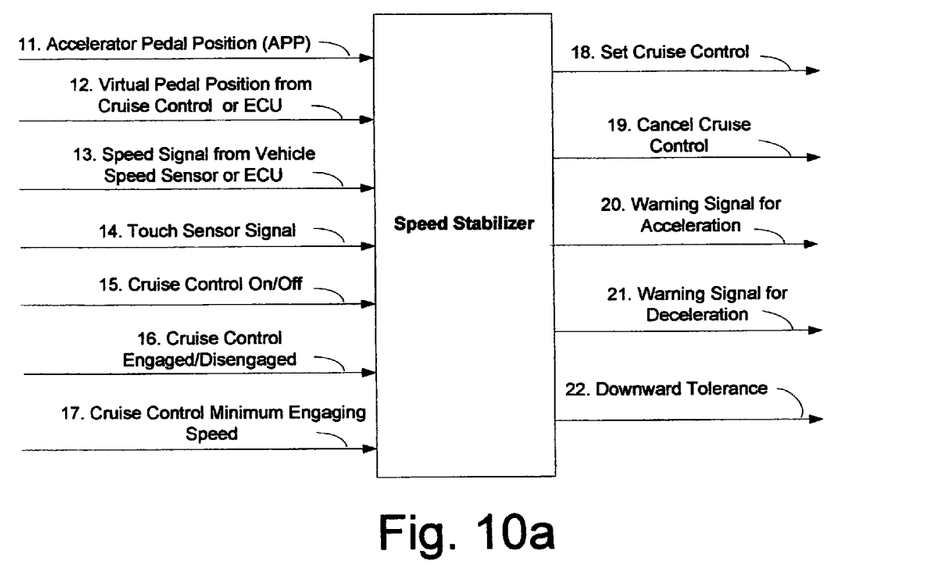
FIGS. 10a-10c disclose the inputs to and the outputs from the speed stabilizer.
Figure 10B:
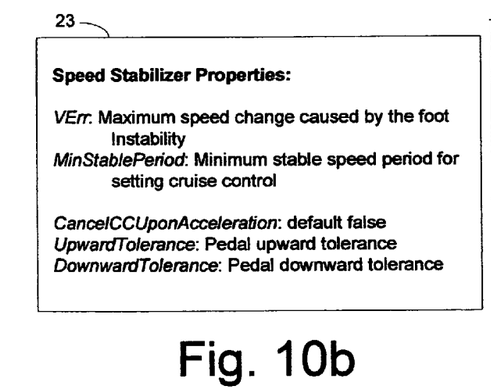
Figure 10C:
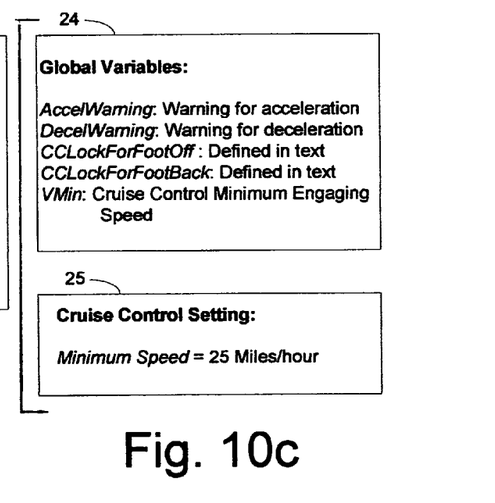

Inputs, Outputs and Properties of the Stabilizer:

FIGS. 10a, 10b, and 10c show the input, output and properties for the speed stabilizer.

Public Properties for Settings: All the settings in FIG. 10b, numerical reference 23, are global to all the flowcharts.

VErr: Speed error. Speed changes less than VErr are considered random errors and the speed is considered stable.

MinStablePeriod: The minimum stable speed period. If the speed is above the cruise control minimum engagement speed and is stable for a period equal to or greater than MinStablePeriod, the cruise control is set at the current speed by the speed stabilizer.

CancelCCUponAcceleration: A setting for the first column "Action Upon Acceleration" in Table 1. True for "Preferred", false for "Conventional".

UpwardTolerance: Setting for upward pedal movement tolerance (10b) as discussed in section "Concepts and Terminologies E".

DownwardTolerance: Setting for downward pedal movement tolerance (10b) as discussed in section "Concepts and Terminologies E". If the setting CancelCCUponAcceleration is true and the throttle is electronic, pedal movement in this tolerance has not effect to the speed. Otherwise, the vehicle accelerates with the cruise control speed setting unchanged. In both cases, when the pedal approaches the low bound of the tolerance, an acceleration warning signal is turned on.

Other Global Variables in FIG. 10c at 24:

AccelWarning: True/False. Warning signal for acceleration.

DecelWarning: True/False. Warning signal for deceleration.

CCLockForFootOff: True/False. A flag enables taking the foot off the gas pedal without cancelling the cruise control after it is set manually. When this variable is true, it allows the stabilizer to ignore the pedal movement in the pedal travel range so that the cruise control will not be cancelled.

CCLockForFootBack: True/False. A flag enables pressing the pedal back to the tolerance zone without cancelling the cruise control after it is set manually. When this variable is true, it allows the stabilizer to ignore the pedal movement in the deceleration zone so that the cruise control will not be cancelled.

VMin: Holding the value from the input Cruise Control Minimum Engaging Speed.

Numerical reference 25 of FIG. 10c contains the cruise minimum engaging speed setting for the cruise control.

FIG. 10a shows the inputs to and the outputs from the speed stabilizer.

Input to the Speed Stabilizer:

Numerical reference 11: Accelerator Pedal Position (APP) signal from the Accelerator Pedal Position Sensor. All vehicles with an Electronic throttle have an accelerator pedal position sensor. To use the speed stabilizer, we need to add this sensor to vehicles with a mechanical throttle.

Numerical reference 12: Virtual Pedal Position: from the ECU or cruise control. See definition in the section 'Concepts and Terminologies'.

Numerical reference 13: Speed signal: from Vehicle Speed Sensor (VSS) directly or from ECU indirectly.

Numerical reference 14: Foot On/Off touch sensor on accelerator pedal signal: when the cruise control is engaged, the pedal is held from moving upward for Pedal-Lock type vehicles. This sensor is used for detecting upward foot movement.

Numerical reference 15: Cruise control (Power) On/Off: from cruise control. The speed stabilizer does not really do anything when this signal is off. Because it is safe to use cruise control with the speed stabilizer, the cruise control can be set to "On" by default. We will explain the safety issue later.

Numerical reference 16: Cruise control Engaged/Disengaged: from cruise control. The Set/Cancel commands from the manual control device sets/cancels the cruise control. The speed stabilizer receives the engage/disengage status of the cruise control through this input.

Numerical reference 17: Cruise control minimum engaging speed: The cruise control cannot be engaged below this speed. Most conventional cruise controls have a minimum speed above 30 miles/hour. For the purpose of using speed stabilizer and cruise control for local driving, we can beneficially allow the minimum speed of the cruise control to be between 20 and 30 miles/hour.

Outputs from the Stabilizer:

Numerical reference 18: Set signal for setting cruise control.

Numerical reference 19: Cancel signal for cancelling the cruise control.

Numerical reference 20: Warning signal for approaching the boundary of the downward speed tolerance (see FIG. 1d).

Numerical reference 21: Warning signal for approaching the boundary of the upward speed tolerance (see FIG. 1d).

Numerical reference 22: Downward tolerance to ECU (engine control unit). It is used for electronic throttle with the setting CancelCCUponAcceleration=True to notify the ECU to ignore the pedal position changes within the downward tolerance range. The ECU software needs minor changes to handle the downward tolerance.

Hardware Implementation for Stabilizer:

Some hardware is required for the speed stabilizer to work with each type of vehicle. Vehicles with a mechanical throttle need to add an accelerator pedal position sensor (APPS) for the input "Accelerator Pedal Position" to the speed stabilizer. For type pedal-lock vehicles, an accelerator pedal with a touch sensor is required for detecting the upward foot movement when the cruise control is engaged and the pedal is locked for upward movement. A pedal somewhat similar to the one in FIG. 3 of U.S. Pat. No. 7,000,722 can be used. There will not be an upward tolerance (or the upward tolerance is zero) in using this device with the speed stabilizer. Since there are no advantages for the pedal-lock type over the pedal-release type, and it requires extra hardware, we prefer pedal-release type over pedal-lock.

Figure 2:
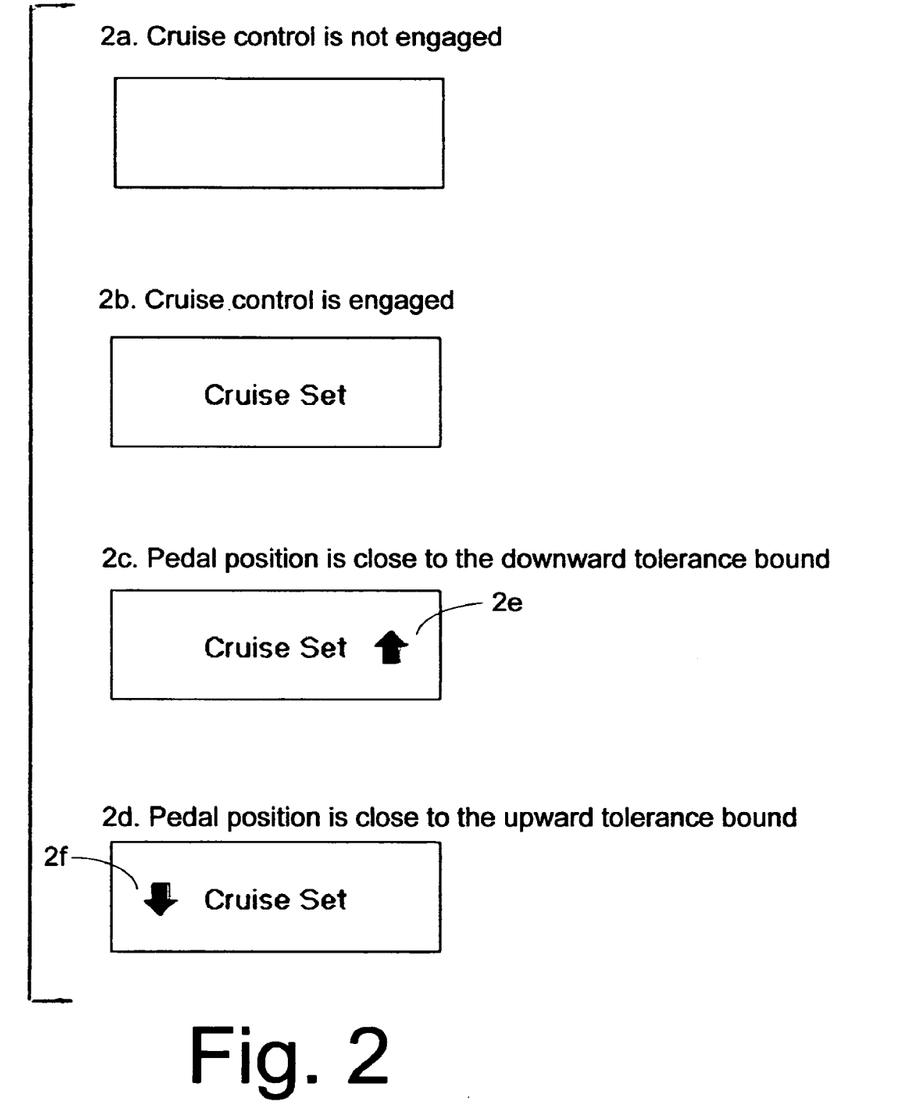
FIGS. 2a-2d schematically disclose the display for the warning device.

An LED display (optional) can be used to display the warning signals for acceleration and deceleration. FIG. 2 schematically shows a series of dashboard displays 2a, 2b, 2c and 2d viewed by the driver. Colors should be used to enhance the visual effect. The arrows 2e and 2f can be flashing for easier detection by the peripheral visual field of the driver.

Figure 3A:
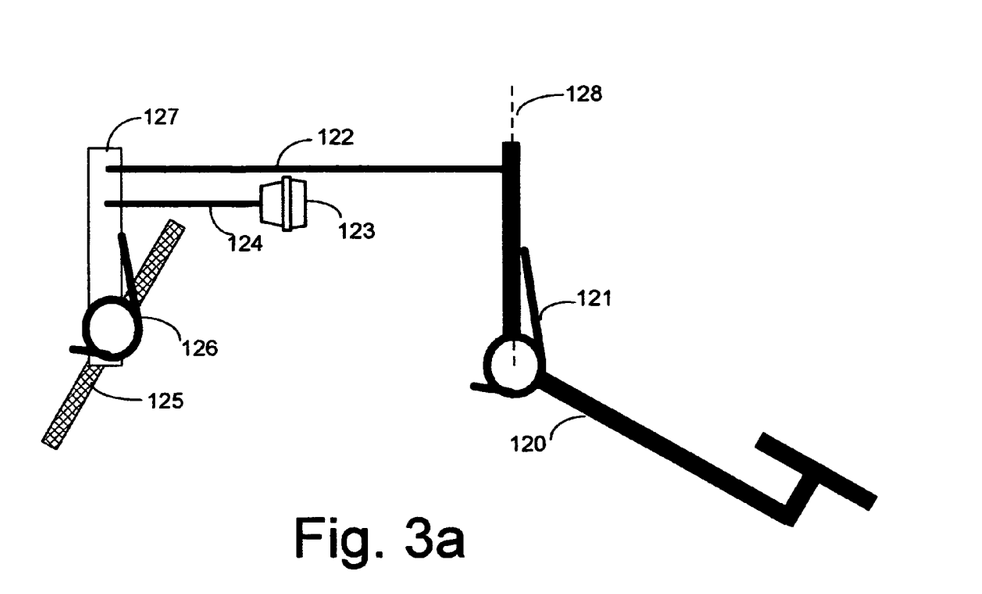
FIG. 3a discloses a pedal-release component arrangement.
Figure 3B:
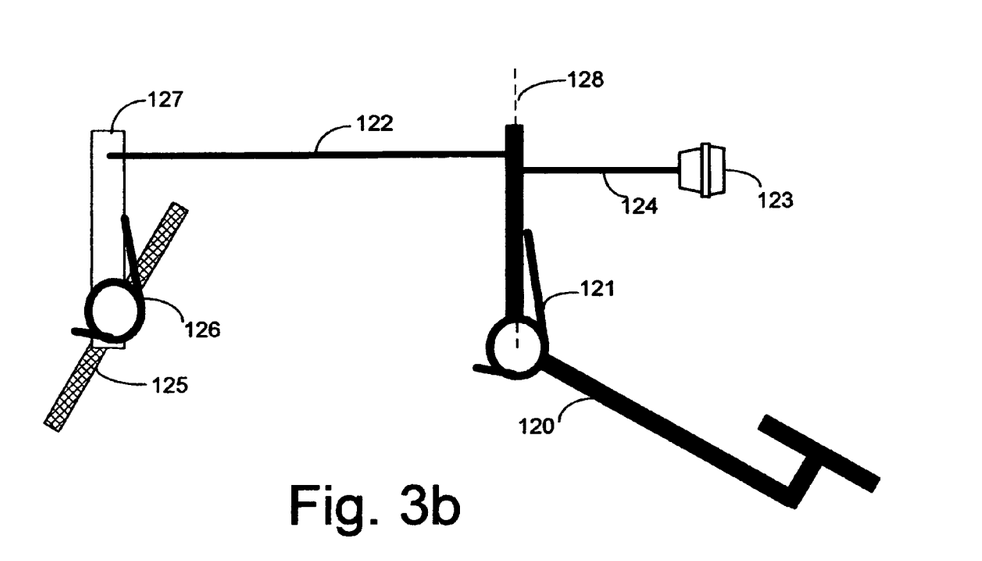
FIG. 3b discloses a pedal-lock component arrangement.

FIGS. 3a and 3b show possible linkages of the mechanical throttle. The Pedal-Release type of FIG. 3a has two torsion springs, 121 and 126, for returning to the start position 128. One for the pedal 120, the other for the throttle valve 125 with a throttle arm 127. The pedal 120 can pull the throttle valve open via the cable 122, and the vacuum actuator 123 of the cruise control can pull the throttle valve open via the cable 124. When the cruise control is engaged, the throttle is held open by the vacuum actuator. If the foot is off the pedal, the spring 121 sends the pedal back to the start position 128.

With the cruise control engaged, the throttle is held by the vacuum actuator 123, moving the pedal from the start position 128 to the virtual pedal position meets only the resistance from one spring 121; moving from the virtual pedal position further down opens the throttle valve wider, and meets resistance from both springs 121 and 126. The two springs with the stronger throttle spring 126 make the virtual pedal position clearly detectable. The detectable virtual pedal position makes the driver easier to hold the foot within the tolerance range. In FIG. 3b, the vacuum actuator 123 pulls the throttle valve from the back of the pedal via both cables 124 and 122. When the valve is held open by the vacuum actuator and the foot is off the pedal, the pedal does not go back to the start position 128. This is an implementation for Pedal-Lock type.

The pedal/throttle system for vehicles with an electronic throttle does not have a mechanical linkage between the pedal and the throttle, and there is nothing to hold the pedal when the cruise control is engaged and the foot is off the pedal. Thus, it should be classified as Pedal-Release type. When the pedal is pressed, the foot only meets resistance from one spring. For this reason, an additional mechanical biasing device such as a spring is desired.

In FIG. 4, (a) and (b) simulate the pedal/throttle system for a mechanical throttle. In FIGS. 4 (a) and (b), the compression spring 135 is not connected to the pedal, and it can be pulled back by the servo 133 controlled by the ECU (engine control unit) via the cable 134. When the cruise control is not engaged (a), pressing the pedal 131 meets resistance both from the torsion spring 132 and the compression spring 135. When the cruise control is engaged, the servo pulls the compression spring to the virtual pedal position 137 (b). Moving the pedal between the start position 136 and the virtual pedal position 137 only meets the resistance from the spring 132, similar to the mechanical throttle. Beyond the virtual pedal position, it meets resistance from both springs 132 and 135. We recommend using this type of pedal system with the speed stabilizer because detecting the virtual pedal position is critical for the driver to keep the foot in the tolerance range. FIGS. 4c and 4d show the implementation for an Electronic Throttle/Pedal-Lock type system. When the cruise control is engaged, the servo 133 holds the pedal 131 at the virtual pedal position 137.

Figure 5:
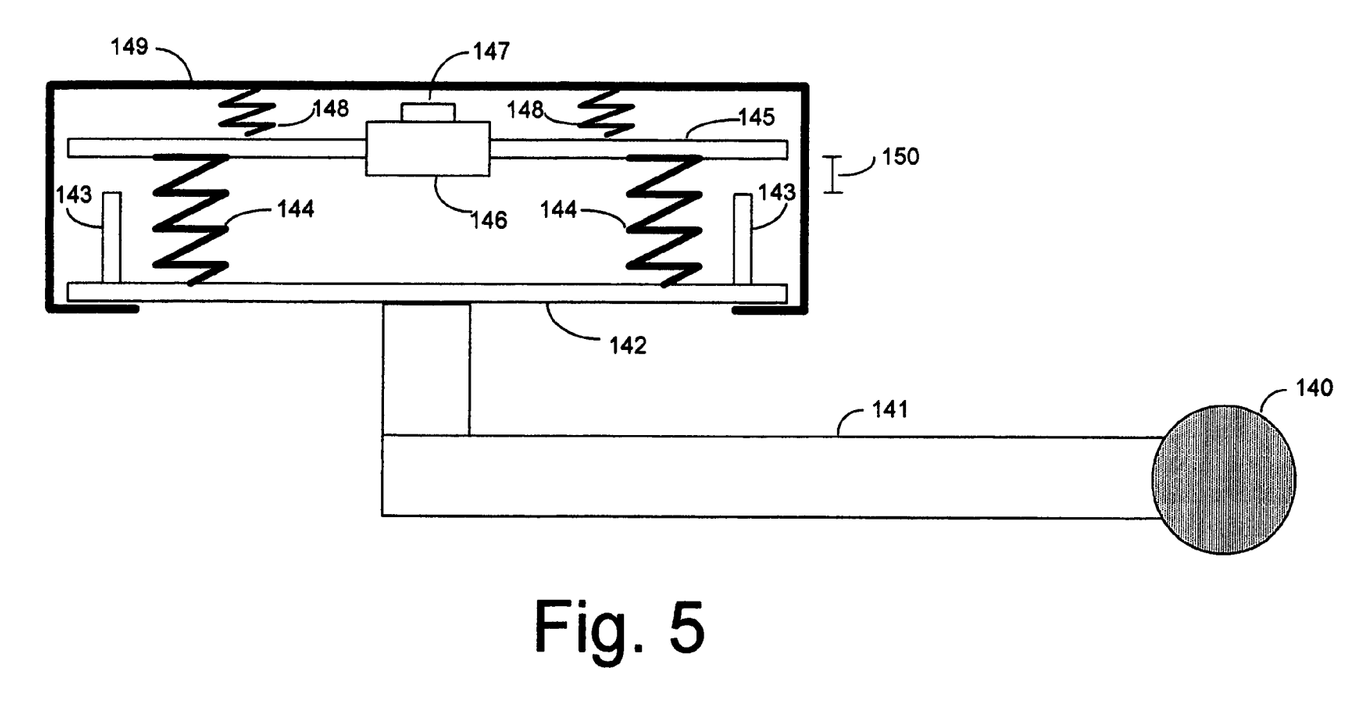
FIG. 5 discloses a pedal with a touch sensor.

FIG. 5 shows a device with a touch sensor. Connections (wires) from the APPS (Accelerator Pedal Position Sensor) and the switch to the stabilizer are not shown in the figure. This device is modified from the one in FIG. 3 of U.S. Pat. No. 7,000,722. This modified device has an upward tolerance range, and thus, is consistent with the pedal-release type. In FIG. 5, the accelerator pedal arm 141 is firmly connected to the support 142 with the stops 143. The switch 146 with a button 147 is held by the switch holder 145, which is supported by the compression springs 144. The jacket 149 or the case of the pedal assembly is supported by the compression springs 148 which are less strong or stiff than the springs 144. The springs 148 keeps the jacket off the button 147 to insure that the switch is off when the foot is off the jacket (the spring inside the switch may not be strong enough to return the button to the off position with the jacket's weight on it). The springs 144 pushes the switch holder 145 back to the start position shown in the figure when the foot is off the jacket and the switch is now off. The switch 146 can be turned on by the pressing jacket 149 or turned off by stepping off the jacket.

The "On/Off" signal of the switch is an input to the speed stabilizer. Moving the switch holder 145 within the distance of 150 does not affect the switch 146 and the APPS (Accelerator Pedal Position Sensor) 140. This distance is the upward tolerance. However, because the accelerator pedal position signal is not changed, the deceleration warning signal will not be triggered. To make the deceleration signal available for the pedal-lock type, a potentiometer can be used for detecting the position of the switch holder, and the position signal is sent to the speed stabilizer. Pressing the jacket 149 further down after the switch holder reaches the stops 143 changes the accelerator position signal generated by the APPS 140. Since there are no advantages for the pedal-lock type over the pedal-release type, and it requires extra hardware, we prefer the pedal-release type over the pedal-lock type.

TABLE 2 summarizes the additional hardware for each type of vehicle.

Figure 4A:
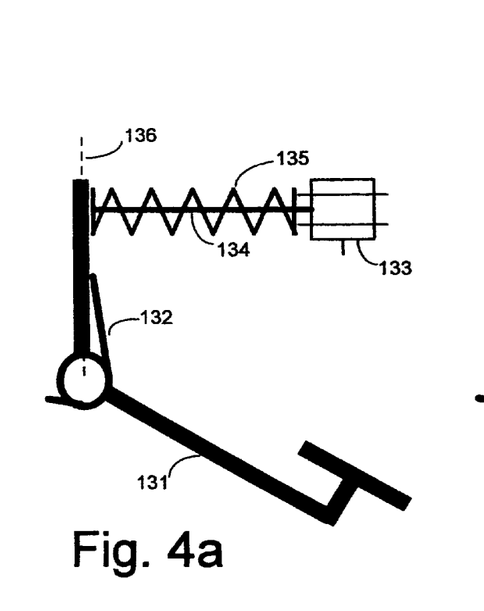
FIGS. 4a and 4b disclose a pedal-release component arrangement.
Figure 4B:
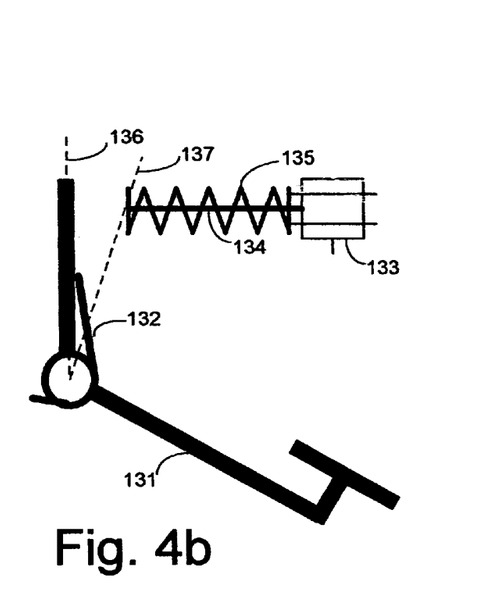
Figure 4C:
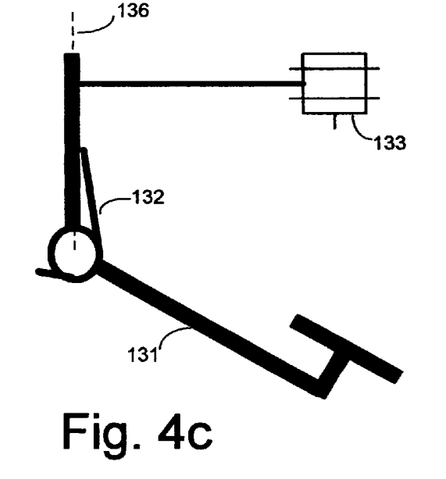
FIGS. 4c and 4d disclose a pedal-lock component arrangement.
Figure 4D:
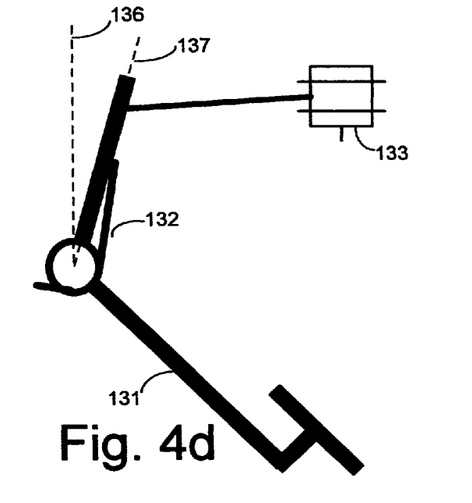

|  | Pedal-Release | Pedal-Lock |
| --- | --- | --- |
| Electronic throttle | Servo and spring in FIG. 4a | Servo in FIG. 4c, Touch Sensor |
| Mechanical Throttle | Accelerator Pedal Position Sensor | Touch Sensor Accelerator Pedal Position Sensor |

As we have mentioned before, the speed stabilizer can be a separate embedded system, or it can be merged into the Engine Control Unit (ECU). In the later case, all inputs should feed into the ECU, and all outputs should be from the ECU. The function of the speed stabilizer is a natural extension of the concept drive-by-wire. It helps the driver to maintain constant speed when needed by filtering out the instability of human operation.

Algorithm and Process of the Speed Stabilizer for Operating Cruise Control with Accelerator Pedal:

A. Speed Stabilizer Events:

Events are subroutines triggered to run at certain conditions. Events are not required for implementing the speed stabilizer software, but it can simplify the algorithms, and make the flowcharts easier to understand. The events run parallel to the main program.

Figure 6:
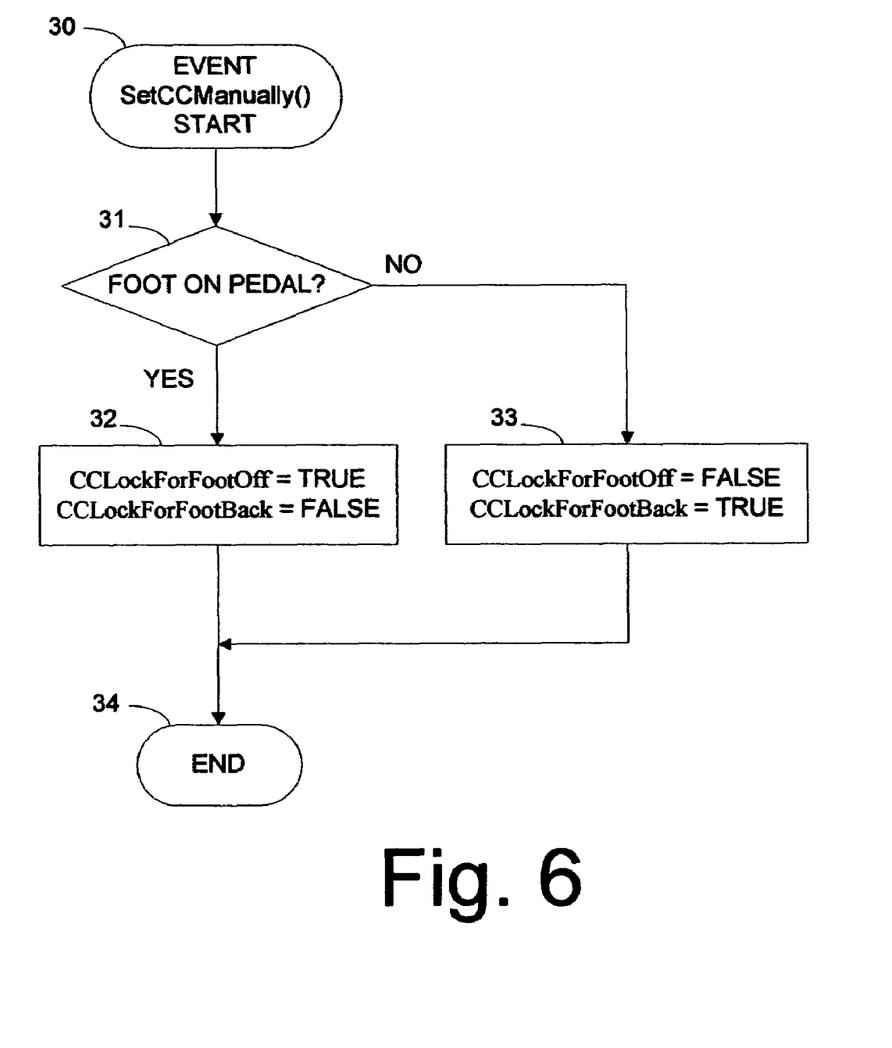
FIG. 6 shows a flowchart for event SetCCManually that is triggered to run when the driver sets or resumes the cruise control manually.

FIG. 6 shows the flowchart for event SetCCManually which is triggered to run when the driver sets or resumes the cruise control manually. This event turns on or off the flags which allow the accelerator travel in the deceleration zone without cancelling the cruise control and generating warning signals. If the foot is on the accelerator, CCLockForFootOff is set to true (32). Otherwise, CCLockForFootBack is set to true (33).

Figure 7:
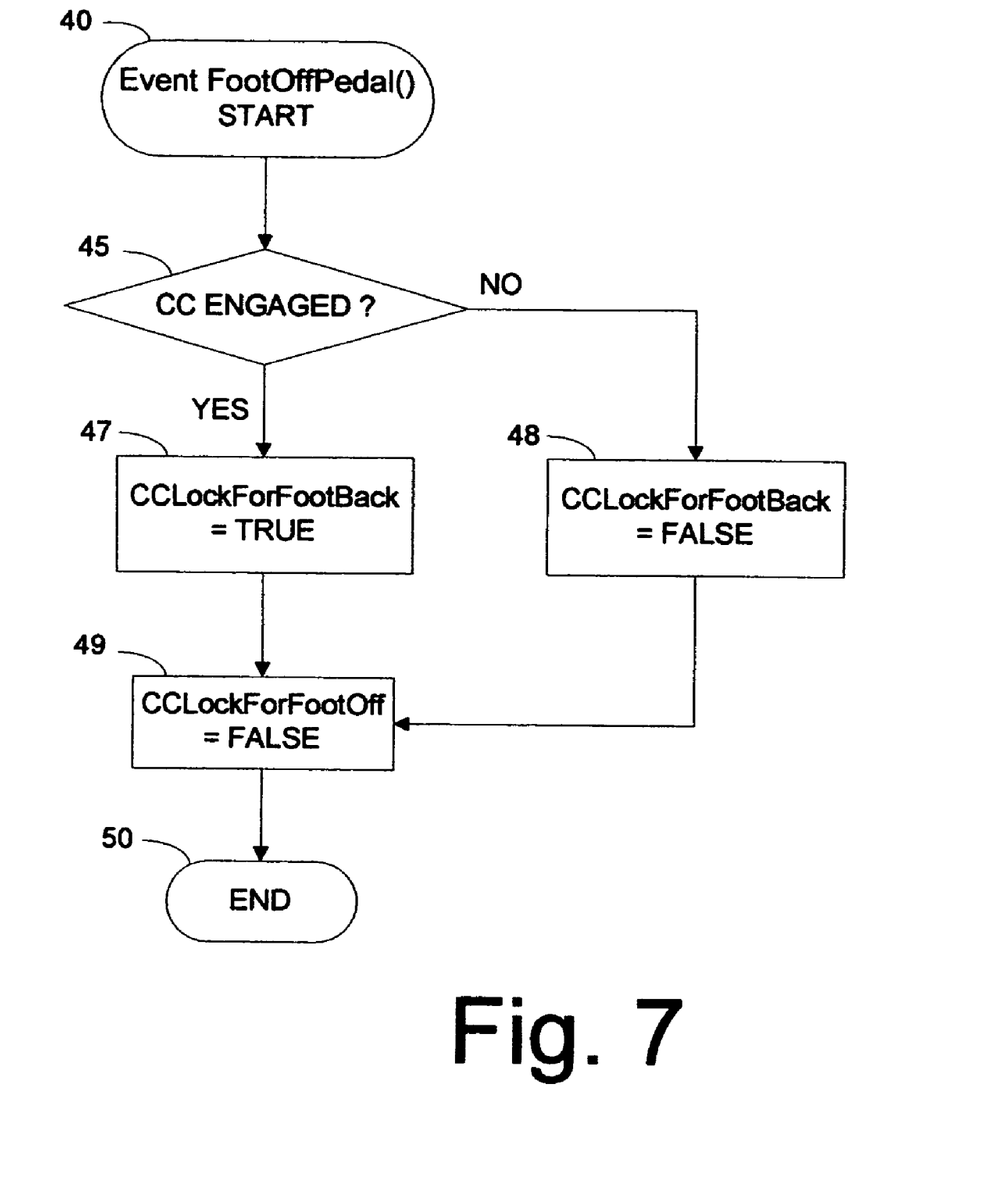
FIG. 7 shows the flowchart for event FootOffPedal that is triggered when the foot is taken of the accelerator pedal.

FIG. 7 shows the flowchart for event FootOffPedal which is triggered when the foot is taken off the accelerator pedal. This event turns off the flag CCLockForFootOff (49) and turns on the flag CCLockForFootBack (47) if the cruise control is engaged (45). This allows the accelerator pedal to pass the deceleration zone and to go back to the upward tolerance zone or the virtual pedal position without cancelling the cruise control.

Figure 8:
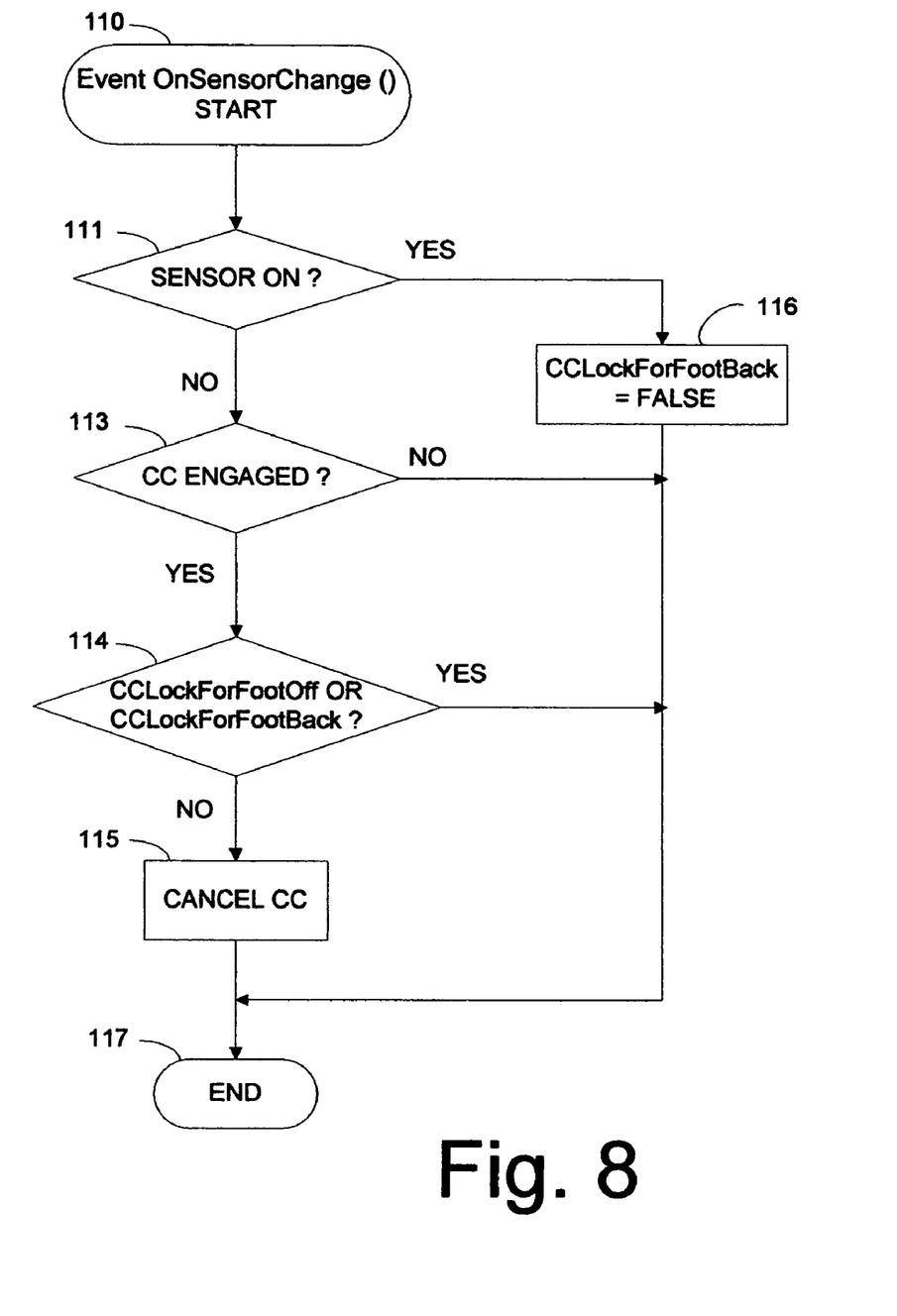
FIG. 8 shows the flowchart for event OnSensorChange, which is triggered when the input value of the touch sensor signal changed.

FIG. 8 shows the flowchart for event OnSensorChange, which is triggered when the input value of Touch Sensor Signal is changed. The main purpose of this event is to cancel the cruise control for pedal-lock vehicles. If the input is changed to 'On' (111), the flag CCLockForFootBack is cleared at 116 to allow the upward pedal movement to cancel the cruise control. If the input is changed to 'Off', the cruise control is cancelled at 115 if the cruise control is engaged (113) and the two flags CCLockForFootOff and CCLockForFootBack are false (114). For pedal-release type, the input Touch Sensor Signal is always false, and this event will never be triggered.

Figure 9:
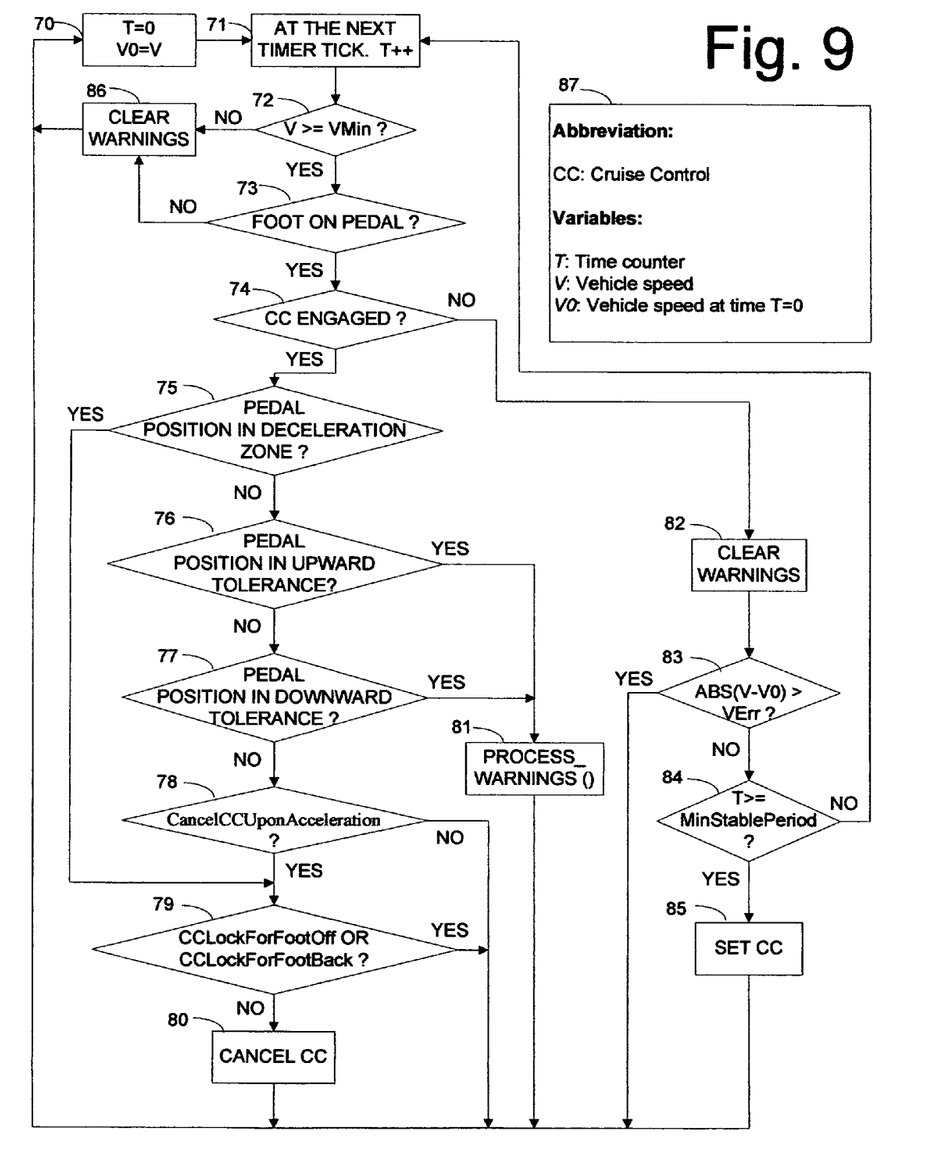
FIG. 9 shows the main program, along with the subroutine in FIG. 11 relating to processing of a warning display schematically indicated in FIG. 2.
Figure 11:
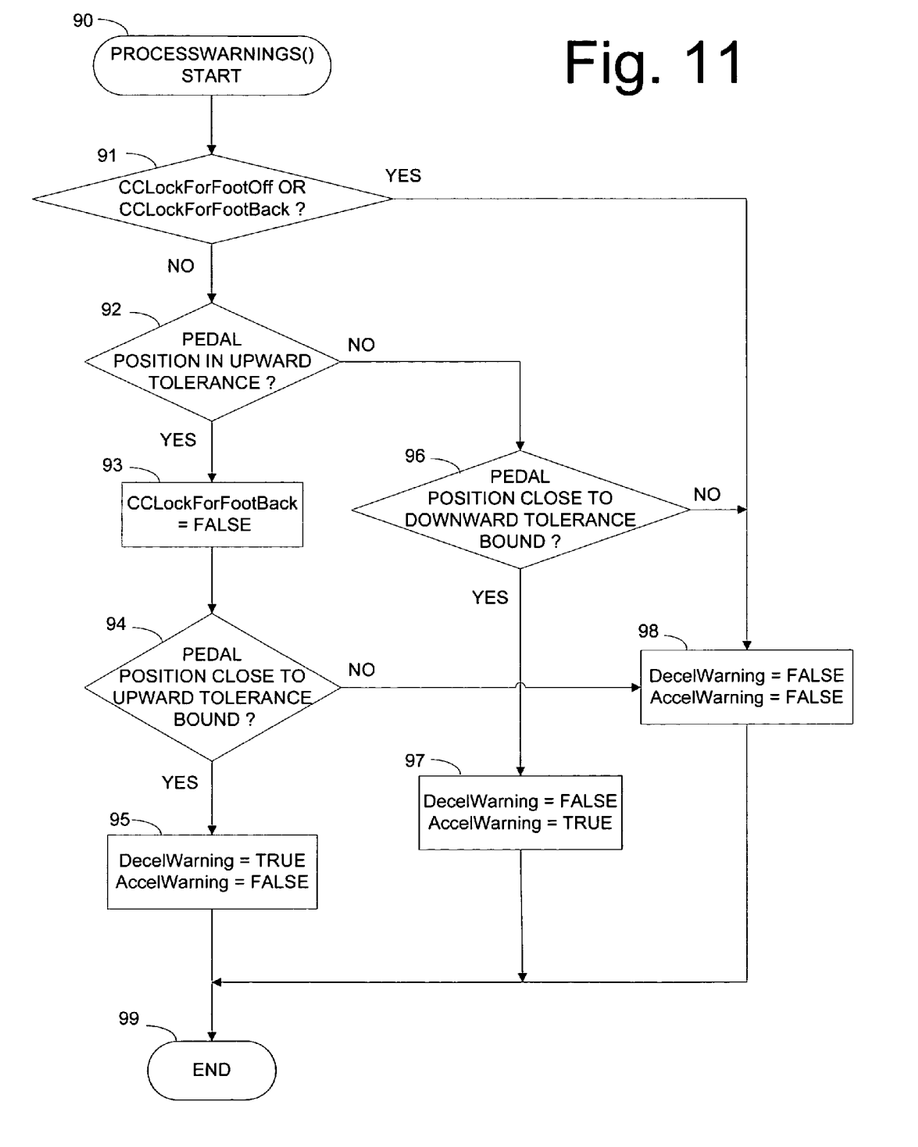
FIG. 11 shows a subroutine relating to processing of a warning display schematically indicated in FIG. 2.

B. Main Program:

FIG. 9 shows the main program, along with the subroutine in FIG. 11 relating to Processing Warnings schematically indicated in FIG. 2 to aid in understanding the process. The FIG. 9 steps perform the following tasks:

Setting cruise control based on the vehicle speed.

Cancelling cruise control based on the accelerator pedal position.

Generating warning signals for acceleration and deceleration.

Bypassing the cancel cruise control process in the main program when the cruise control is set or resumed manually.

The main program is an infinite loop when the power is switched on. It starts with setting the time counter T to zero and the initial speed V0 to the current speed V (70), then increasing T by 1 at the next timer tick event in block 71. T is used for counting the speed stable period. Block 84 is the end of the only branch (71, 72, 73, 74, 82, 83, and 84) requiring continually counting the speed stable period and looping back to block 71. All the other paths loop back to block 70 to reset T and V0.

If the speed is less than the cruise control minimum engagement speed VMin (72) or the foot is not on the accelerator pedal (73), the warning signals AccelWarning and DecelWarning are cleared (or set to false) at block 86 before looping back to block 70. Warning signals are used to help maintain a stable speed.

The setting cruise control steps (82, 83, 84, and 85, including loop back to 70, 71, 72, 73 and 74) are used for setting the CC system when the vehicle speed (V) stays within predetermined boundary limits (VErr) for a particular predetermined time period, the MinStablePeriod. Upon the instant the cruise control is engaged at the CC engagement speed, a virtual pedal position is established (FIG. 1b, 1c) and the pedal travel range is divided into four sub-ranges (1d) as described in the "Concepts and Terminologies" section above.

The left branch of block 74 implements the behavior in Table 1. Deceleration detection for pedal-release type of vehicles steps (75, 79 and 80) are for canceling the CC when the pedal position is in the deceleration zone. Deceleration detection for pedal-lock type of vehicles steps (111 through 115 in FIG. 8) are for canceling the CC when the pedal position is in the deceleration zone. Acceleration detection steps (77 through 80) are for cancelling the CC when the pedal position is in the acceleration zone and the setting CancelCCUponAcceleration is true. Cancelling cruise control will be bypassed if either CCLockForFootOff or CCLockForFootBack is true. After the cruise control is cancelled at block 80, the warning signals are cleared (or set to false) at block 82 in the next pass of the loop.

The warning signals are processed at block 81 if the pedal is in the upward tolerance or downward tolerance region. The details are shown in FIG. 11. Warning signals are turned off (98) if either CCLockForFootOff or CCLockForFootBack is true. These flags indicate that the process evoked by manually setting the cruise control is not completed yet. The deceleration warning signal is turned on (95) if the pedal position is in the upward tolerance (92) and is close to the upward tolerance bound (94). The flag CCLockForFootBack is turned off when the pedal is in the upward tolerance range. The acceleration warning signal is turned on (97) if the pedal position is in the downward tolerance region and is close to the downward tolerance bound (96). In all other cases, both warning signals are cleared (98).

C. Manually Set/Resume Cruise Control:

Since the speed stabilizer can set and cancel the cruise control, manually setting and cancelling the cruise control is given higher priority. The following cases should be avoided:

The cruise control is set by the speed stabilizer right after it was cancelled by pressing the brake or clutch, or by pressing the cancel button.

The cruise control is cancelled by the speed stabilizer right after it was set by pressing the set button.

The first case will not happen. When the driver presses the brake or clutch, the foot is not on the accelerator pedal (73), and thus, the cruise control will not be set at block 85. Another way to disengage the cruise control is pressing the "Cancel" button. The subsequent action normally is to release the pedal to reduce the speed. In this case, the pedal will be in the deceleration zone and the cruise control will not be set.

The second case to avoid is handled by a pair of flags CCLockForFootOff and CCLockForFootBack. Table 3 shows the changes of the flags and the cruise control status in the series of actions after the cruise control is manually set or resumed. Both flags are false if the cruise control is not engaged. If either one is true at block 79, the program bypasses the action Cancel CC at block 80. CCLockForFootOff is set to true when the cruise control is set manually if the foot is on the accelerator pedal, and remains true before the foot is off the pedal. When the foot is off the accelerator pedal, as it normally is when the driver manually sets or resumes the cruise control, CCLockForFootOff is set to false and CCLockForFootBack is set to true. This enables the driver to move the pedal back to the upward tolerance range or the virtual pedal position without cancelling the cruise control. When the pedal is in the upward tolerance range or at the virtual pedal position, CCLockForFootBack is set to false. The important difference is that the speed stabilizer only allows the driver to take the foot off the pedal, and put the pedal back to the upward tolerance 1 time. After the pedal is back, the stabilizer regains the ability to cancel the cruise control.

II. Pedal position tolerance is a range in angle from 1 to a few degrees.

III. Let VPP be the virtual pedal position, UTol be the upward tolerance, DTol be the downward tolerance and CurPos be the current pedal position. We can have the following pseudo code. All the four variables are quantities in angle.

If (CurPos>(VPP+DTol)) then Cancel CC 'CurPos is in the acceleration zone

If (CurPos<(VPP−UTol)) then Cancel CC 'CurPos is in the deceleration zone

SUMMARY OF ADVANTAGES OF THE INVENTION

Fuel efficiency: The road test conducted by www.edmunds.com showed up to 14-percent savings in gas, and an average of 7-percent savings in gas. Both the U.S. Environmental Protection Agency and the Canada Office of Energy Efficiency suggest using cruise control for saving gas. However, conventional cruise control can only be used on highways with low traffic volume. This invention enables us to use cruise control most of the time, and fully takes advantage of cruise control to save gas.

Safety: With cruise control engaged on a slippery road, stepping on the brake to disengage cruise control can result in losing control of the vehicle. With this invention, the cruise control is disengaged when the pedal moves out of the small upward tolerance range for reducing vehicle speed. The usage of braking to disengage the cruise control is completely eliminated when the foot is on the accelerator pedal. With this invention, using cruise control is identical to driving with the accelerator pedal perfectly stable, and thus, it is as safe as driving without cruise control.

TABLE 3

Changes of flags and status after cruise control is manually set or resumed

| Actions in Sequence | CCLockForFootOff | CCLockForFootBack | CC Engaged |
| --- | --- | --- | --- |
| Setting or Resuming CC manually | True (set at block 32 in FIG. 6) | False | True |
| Moving pedal in the pedal travel range | True | False | True |
| Taking foot off the pedal | False (Cleared at block 49 in FIG. 7) | True (Set at block 47 in FIG. 7) | True |
| Moving pedal back to the deceleration zone | False | True | True |
| Moving pedal into the upward tolerance or to the virtual pedal position | False | False (Cleared at block 93 in FIG. 11 and block 116 in FIG. 8) | True |
| Moving pedal into the deceleration zone or acceleration zone with CancelCCUponAcceleration = True | False | False | False (Disengaged at block 80 in FIG. 9) |

Additional Programming Information:

While programming the stabilization processor to establish the aforesaid virtual pedal position and the pedal position tolerance motion range will be obvious to the skilled programmer, the following may be in order.

I. All the inputs to the micro-processor are digital. So the input from the accelerator pedal position sensor (APPS) and the virtual pedal position from cruise control or engine control unit (ECU) are numbers. These numbers can be interpreted as angles between the start position and the end position in FIG. 1.

Driving workload: The speed stabilizer completely eliminates hand operations for using cruise control in low speed and heavy traffic driving. The two spring design in FIG. 3 and FIG. 4 makes the virtual pedal position easy to detect. With the stronger spring 126 or 134, the accelerator pedal can actually serve as a foot rest when cruise control is automatically engaged. There is no extra workload for constantly adjusting the speed as driving a vehicle without a speed stabilizer.

Driving on hilly roads: Using cruise control on hilly road is not suggested because it does not save gas, and it is easy to pass the engaged speed. With the speed stabilizer, the tolerance range shifts with the virtual pedal position as the vehicle going up or down hill. This results in the pedal position out of the tolerance ranges on bigger slopes, and cruise control is automatically canceled.

The speed stabilizer is also superior to the Adaptive Cruise Control (ACC). First, it does not have the "Tunnel Vision" effect with ACC as described in the "Background of the Invention" section. Second, it is less likely to have the "Highway Hypnosis" effect with using ACC because the foot is on the accelerator pedal when the cruise control is on. This makes the driver more responsive. Finally, the implementation is much simpler and the cost is much lower than the Adaptive Cruise Control.

While the invention has been described in connection with preferred embodiments, the description is not intended to limit the scope of the invention to the particular forms set forth, but on the contrary, it is intended to cover such alternatives, modifications, and equivalents as may be included within the spirit and scope of the invention as indicated by the language of the appended claims. For example the upper boundary of the tolerance range can be zero.

What is claimed is:

1. A method of employing a vehicle speed stabilization processor for setting and canceling a cruise control system (CC) coupled thereto by operating an accelerator pedal, said processor executing the following steps:
   (a) setting the CC at a CC engagement speed when a given vehicle speed exceeds a minimum vehicle speed and said given vehicle speed stays within predetermined boundary limits for a particular time period;
   (b) establishing a virtual pedal position that is whatever pedal position corresponds to a vehicle throttle position at said CC engagement speed;
   (c) upon setting of the CC, establishing a pedal position tolerance motion range about a current virtual pedal position within which the pedal can travel without canceling the CC;
   (d) canceling the CC when the pedal position becomes higher than an upper boundary of the pedal position tolerance motion range; and
   (e) canceling the CC when the pedal position becomes lower than a lower boundary of the pedal position tolerance motion range.

2. The method of claim 1 including disabling steps (d) and (e) upon actuation by a driver of conventional set or resume control buttons of the CC, thereby allowing the driver to take his foot off of the pedal on a highway with low traffic without canceling cruise control.

3. The method of claim 2 including the step of generating warning signals when the pedal position is close to the upper or lower bounds of the tolerance motion range to inform the driver that further movement of the pedal will cancel the CC.

4. The method of claim 3 including the step of disabling generating warning signals when steps (d) and (e) are disabled, thereby to no longer inform the driver that further movement of the pedal will cancel the CC.

5. The method of claim 1 wherein said particular time period is a few seconds in duration.

6. The method of claim 1 including the step of generating warning signals when the pedal position is close to the upper or lower bounds of the tolerance motion range to inform the driver that further movement of the pedal will cancel the CC.

7. A method of employing a vehicle speed stabilization processor for setting and canceling a cruise control system (CC) coupled thereto, for a vehicle having an electronic throttle, by operating a pedal release type accelerator pedal mechanically biased to assume an upward start position by a first mechanical biasing means, said processor executing the following steps:
   (a) setting the CC at a CC engagement speed when a given vehicle speed exceeds a minimum vehicle speed and said given vehicle speed stays within predetermined boundary limits for a particular time period;
   (b) establishing a virtual pedal position that is whatever pedal position corresponds to a vehicle throttle position at said CC engagement speed;
   (c) upon setting of the CC, establishing a pedal position tolerance motion range about a current virtual pedal position within which the pedal can travel without canceling the CC;
   (d) canceling the CC when the pedal position becomes higher than an upper boundary of the pedal position tolerance motion range;
   (e) canceling the CC when the pedal position becomes lower than a lower boundary of the pedal position tolerance motion range; and
   (f) upon setting of the CC, positioning a second mechanical biasing means for resisting further downward motion of said pedal at the current virtual pedal position for increasing the resistance sensed by a driver as said pedal passes in the vicinity of the current virtual pedal position, thereby enabling the driver to readily locate the current virtual pedal position and thus make it easier for the driver to hold his foot within the tolerance range.

8. The method of claim 7 wherein said second mechanical biasing means comprises a spring having a terminal portion separated from a portion of said pedal by an angle corresponding to said virtual pedal position when said CC is engaged.

9. The method of claim 7 including disabling steps (d) and (e) upon actuation by a driver of conventional set or resume control buttons of the CC, thereby allowing the driver to take his foot off of the pedal on a highway with low traffic without canceling the CC.

10. The method of claim 9 including the step of generating warning signals when the pedal position is close to the upper or lower bounds of the tolerance motion range to inform the driver that further movement of the pedal will cancel the CC.

11. The method of claim 10 including the step of disabling generating warning signals when steps (d) and (e) are disabled, thereby to no longer inform the driver that further movement of the pedal will cancel the CC.

12. The method of claim 7 wherein said particular time period is a few seconds in duration.

13. The method of claim 7 including the step of generating warning signals when the pedal position is close to the upper or lower bounds of the tolerance motion range to inform the driver that further movement of the pedal will cancel the CC.

14. A method of employing a speed stabilization processor for setting and canceling a cruise control system (CC) coupled thereto by employing a pedal lock accelerator pedal, said processor executing the following steps:
   (a) setting the CC at a CC engagement speed when a given vehicle speed exceeds a minimum vehicle speed and said given vehicle speed stays within predetermined boundary limits for a particular time period;
   (b) establishing a virtual pedal position that is whatever pedal position corresponds to a vehicle throttle position at said CC engagement speed;
   (c) upon setting of the CC, establishing a pedal position tolerance motion range about a current virtual pedal position within which the pedal can travel without canceling the CC;

(d) canceling the CC when the pedal position becomes lower than a lower boundary of the pedal position tolerance motion range;

(e) canceling the CC when the pedal position becomes higher than an upper boundary of the pedal position tolerance motion range by sensing the reduction of pressure upon a pedal mounted touch sensor.

15. The method of claim 14 wherein step (e) is executed by providing a touch sensor having a built in upward tolerance for preventing CC cancellation unless pedal shifting in an upward direction exceeds the upper boundary of said tolerance motion range.

16. The method of claim 14 including disabling steps (d) and (e) upon actuation by a driver of conventional set or resume control buttons of the CC, thereby allowing the driver to take his foot off of the pedal on a highway with low traffic without canceling cruise control.

17. The method of claim 16 including the step of generating warning signals when the pedal position is close to the upper or lower bounds of the tolerance motion range to inform the driver that further movement of the pedal will cancel the CC.

18. The method of claim 17 including the step of disabling generating warning signals when steps (d) and (e) are disabled, thereby to no longer inform the driver that further movement of the pedal will cancel the CC.

19. The method of claim 14 wherein said particular time period is a few seconds in duration.

20. The method of claim 14 including the step of generating warning signals when the pedal position is close to the upper or lower bounds of the tolerance motion range to inform the driver that further movement of the pedal will cancel the CC.

* * * * *